Aug. 18, 1931.  G. W. ALDEEN  1,819,315

SASH PULLEY

Filed May 18, 1928

Witness:

Inventor:
Gedor W. Aldeen
By Ira J. Wilson
Atty.

Patented Aug. 18, 1931

1,819,315

UNITED STATES PATENT OFFICE

GEDOR W. ALDEEN, OF ROCKFORD, ILLINOIS, ASSIGNOR TO NATIONAL LOCK CO., OF ROCKFORD, ILLINOIS, A CORPORATION OF DELAWARE

SASH PULLEY

Application filed May 18, 1928. Serial No. 278,689.

This invention relates to pulleys in general and more particularly to sash pulleys.

It is essential that sash pulleys be capable of economical manufacture in order to be marketable and that they operate without noise and with a minimum of attention from the standpoint of lubrication.

The primary object of this invention is accordingly, to provide a pulley which may be economically manufactured and which is noiseless and requires no lubricating.

Other and further objects of this invention will be apparent as the same becomes better understood from an examination of the specification and claim in connection with the accompanying drawings wherein:

Figure 3:
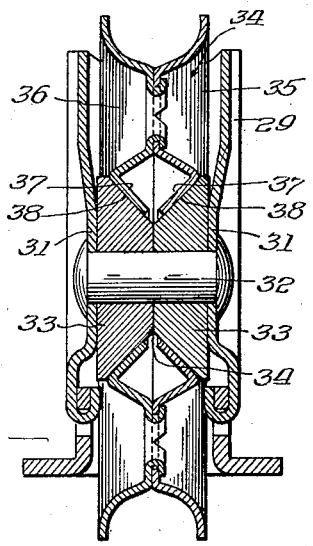
Fig. 3 is a similar view of another modification.

Referring to the drawings more particularly:

Numeral 4 represents a standard sheet metal sash pulley housing provided with inwardly struck annular portions 5 and 6 on its respective opposite walls. These portions 5 and 6 constitute a support for the pulley and meet midway between the walls of the housing 4 and are seamed together by an annular flange 8, integral with the portion 6 and overlapping an annular flange 9, integral with the portion 5. The outer periphery of the portions 5 and 6 cooperate to form a V shaped annular groove 7, the bottom of which is in a plane midway between and parallel to the walls of the housing. This groove 7 forms a supporting track or bearing surface for the pulley generally designated by the reference character 11.

The pulley 11 is formed by stamping two sheet metal similar complemental parts, 12 and 13 respectively, securing said parts together and clamping a lubricant impregnated wood bushing or bearing 19 therebetween. The parts 12 and 13 each have annular web portions 14 and 15 respectively and are riveted together by striking a plurality of spaced tangs 16 integral with the portion 15 through corresponding apertures in the portion 14 with the ends of said tangs overlapping the latter portion at the marginal edges of said apertures.

The parts 9 and 11, previous to their being riveted together, are stamped to provide oppositely curved circular marginal portions which cooperate to form a peripheral groove 16 on the pulley to provide a track for a cord.

The parts 12 and 13 are also stamped, previous to their being riveted together to provide marginal flanges 17 and 18 respectively which cooperate to clamp the circular wood bearing 19 between said parts as the latter are riveted together.

The bushing 19 is V-shaped it being provided with annular sloping sides, 21 and 22 respectively, which cooperate with the respective walls of the groove 7 and contact said walls not only during rotational movement of the pulley but to resist lateral thrust thereon keeping the pulley in central position within the housing at all times.

Figure 2:
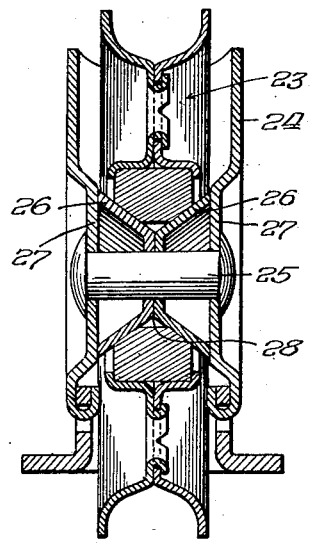
Fig. 2 is a similar view of a modification.
Figure 1:
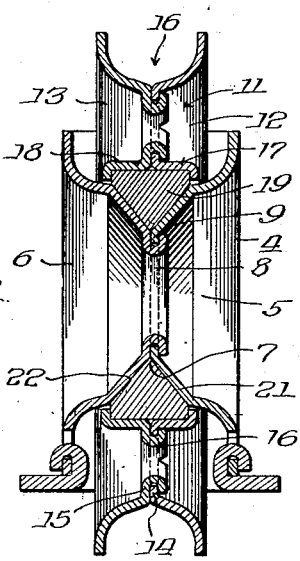
Fig. 1 represents a transverse sectional view of a pulley embodying this invention.

In Figure 2 there is shown a modification in which the pulley proper, here designated as 23, is very much the same as in the previous embodiment. In this modification however, the support for the pulley 23 includes not only the usual housing 24 and transverse pin 25, but also a pair of opposed members 26, stamped from sheet metal each in the form of a frustrum of a cone the smaller ends of said members coming together midway between the opposite walls of said housing. The pin 25 extends through the respective smaller ends of the members 26 and acts to support the same, the outer ends of said members being supported by inwardly struck portions 27 on the respective opposite walls of the housing. The members 26 are concentric with the pin 25 their outer peripheries cooperating in the same manner as the outer peripheries of the portions 5 and 6 in the previous embodiment to form a V-shaped groove 28 for tracking the pulley.

In Figure 3 there is shown another modification which differs somewhat from those previously described. In this modification reference character 29 represents a standard sheet metal housing provided with opposite inwardly struck portions on the respective opposite walls of the housing. A transverse pin 32 for the pulley is mounted in the housing 29 and extends through the centers of the respective portions 31. Clamped between the portions 31 on the pin 32 is a pair of annular lubricant impregnated wood bearings 33, the outer peripheries of which cooperate to provide a V-shaped annular groove 34. The bottom of the groove 34 is midway between the walls of the housing 29 and the walls of said groove act as a track for the pulley generally designated by the reference character 34.

The pulley is formed by stamping two sheet metal similar complemental parts 35 and 36 respectively and securing said parts together in the same manner as in the previous embodiments. These parts have however on the inner marginal portions of their webs, angular flanges 37, presenting outwardly disposed surfaces 38 respectively adapted to contact the respective opposite sides of the groove 34 for engaging the same during the rotational movement of the pulley and during any lateral thrust upon the pulley.

It will be apparent that the bearing surfaces provided by the fibrous bearing in each modification not only take up the friction during the rotational movement of the pulleys but are also contacted during lateral thrust on the pulleys to keep the same centered within the housings.

I am aware that many changes may be made without departing from the principles of this invention and I therefore do not wish to be limited to the details shown or described.

I claim:

A pulley of the character described comprising, in combination, a pulley housing having a pulley supporting and a bearing surface extending transversely of the housing, an annular fibrous bushing mounted on said bearing surface, a pulley mounted on said bushing and provided with flanges engaging the bushing for preventing relative lateral movement between said pulley and bushing, said pulley and flanges being spaced out of contact with both said bearing surface and said housing, said supporting surface having a circular groove and said bushing having a complementary bearing face to prevent lateral movement of said bushing on said bearing surface and to absorb lateral thrusts of said pulley.

In witness of the foregoing I affix my signature.

GEDOR W. ALDEEN.